United States Patent
Kumar et al.

(10) Patent No.: US 10,828,675 B2
(45) Date of Patent: Nov. 10, 2020

(54) OPTICAL CLEANING CARTRIDGE

(71) Applicant: Illumina, Inc., San Diego, CA (US)

(72) Inventors: Ashish Kumar, San Diego, CA (US); Peter Clarke Newman, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 0 days.

(21) Appl. No.: 16/373,243

(22) Filed: Apr. 2, 2019

(65) Prior Publication Data

US 2019/0308222 A1 Oct. 10, 2019

Related U.S. Application Data

(60) Provisional application No. 62/677,092, filed on May 28, 2018, provisional application No. 62/655,777, filed on Apr. 10, 2018.

(51) Int. Cl.
*B08B 1/00* (2006.01)
*B08B 3/04* (2006.01)
*G02B 27/00* (2006.01)

(52) U.S. Cl.
CPC .............. *B08B 1/00* (2013.01); *B08B 3/041* (2013.01); *G02B 27/0006* (2013.01)

(58) Field of Classification Search
CPC .. B08B 1/00; B08B 3/041; B08B 3/04; B08B 7/04; G02B 27/0006
USPC .......................................................... 359/509
See application file for complete search history.

(56) References Cited

U.S. PATENT DOCUMENTS

| | | | |
|---|---|---|---|
| 4,640,489 A * | 2/1987 | Larsen | B29D 11/00057 249/122 |
| 4,870,636 A | 9/1989 | Yamamoto | |
| 5,094,609 A * | 3/1992 | Kindt-Larsen | B29D 11/00067 425/445 |
| 5,128,923 A | 7/1992 | Hasegawa et al. | |
| 5,278,821 A | 1/1994 | Kawamura et al. | |
| 5,307,334 A | 4/1994 | Sato et al. | |
| 5,329,511 A | 7/1994 | Sato | |
| 5,365,630 A | 11/1994 | Beckrich | |
| 5,953,301 A | 9/1999 | Shimo et al. | |
| 6,695,988 B1 * | 2/2004 | Schlagel | B08B 3/04 264/2.6 |
| 7,811,503 B2 * | 10/2010 | Daulton | B29D 11/0025 264/344 |
| 8,596,782 B2 * | 12/2013 | Matsuzawa | A61L 2/26 351/159.33 |
| 2009/0052033 A1 | 2/2009 | Fujiwara et al. | |
| 2013/0331298 A1 | 12/2013 | Rea | |
| 2016/0363603 A1 | 12/2016 | Azarnia et al. | |

OTHER PUBLICATIONS

Isopropyl Alcohol Gas Detection Tube Description, No. 150U, downloaded from Internet prior to Apr. 10, 2018.
NovaSeq 6000 System Guide Translated into Korean [online], Illumina, Inc., English version retrieved from: <URL: https://support.illumina.com/content/dam/illumina-support/documents/documentation/system_documentation/novaseq/novaseq-6000-system-guide-1000000019358-11.pdf.> Sep. 30, 2017, 88 pages.

* cited by examiner

*Primary Examiner* — William R Alexander
(74) *Attorney, Agent, or Firm* — Illumina, Inc.

(57) ABSTRACT

An optical cleaning cartridge for automated cleaning of optical components of analysis instruments is disclosed.

22 Claims, 13 Drawing Sheets

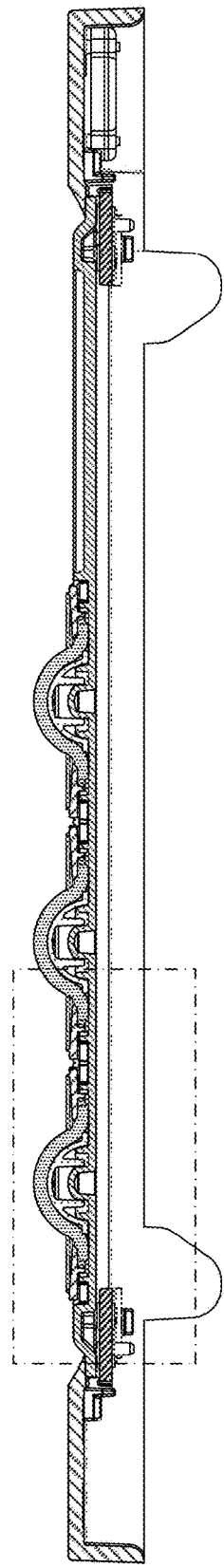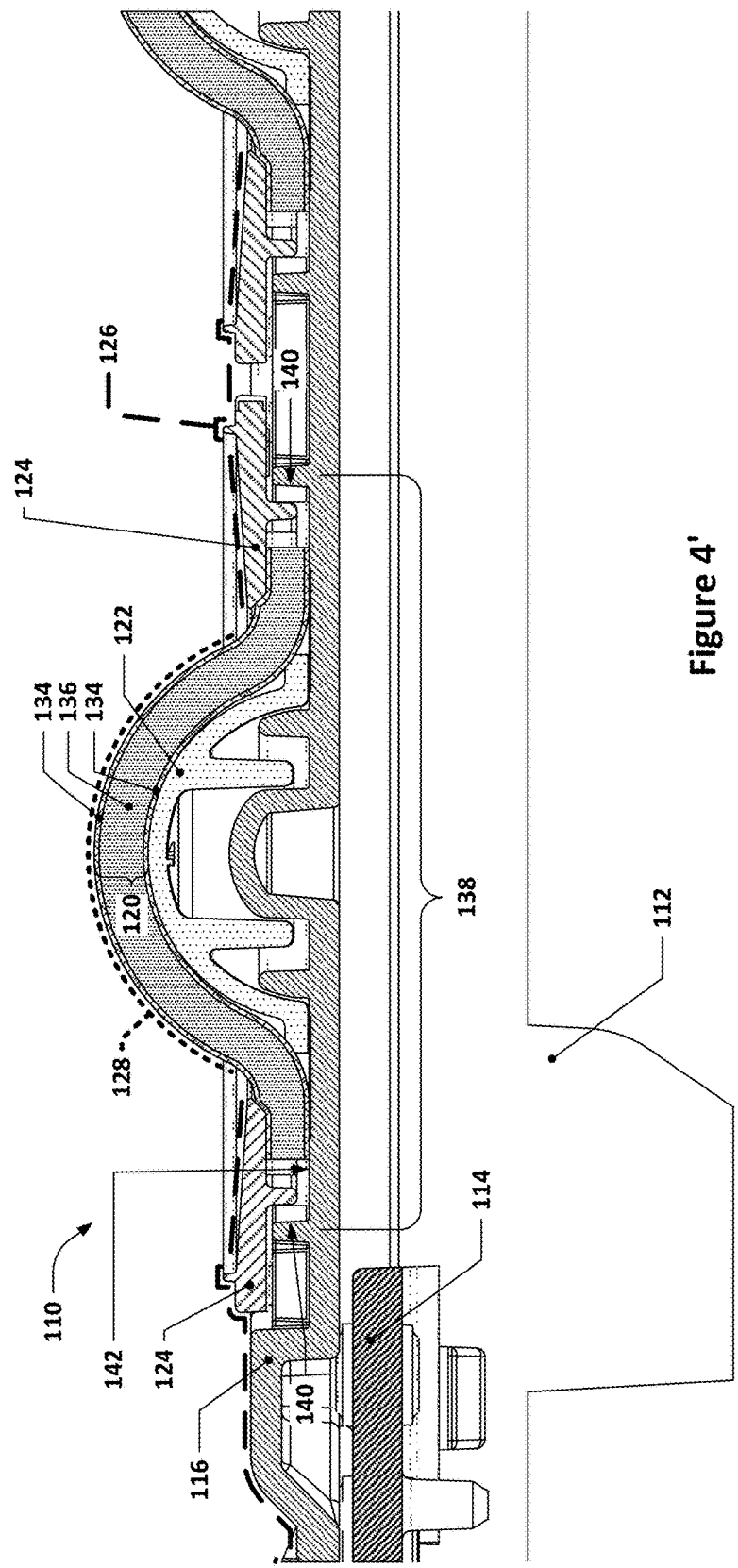

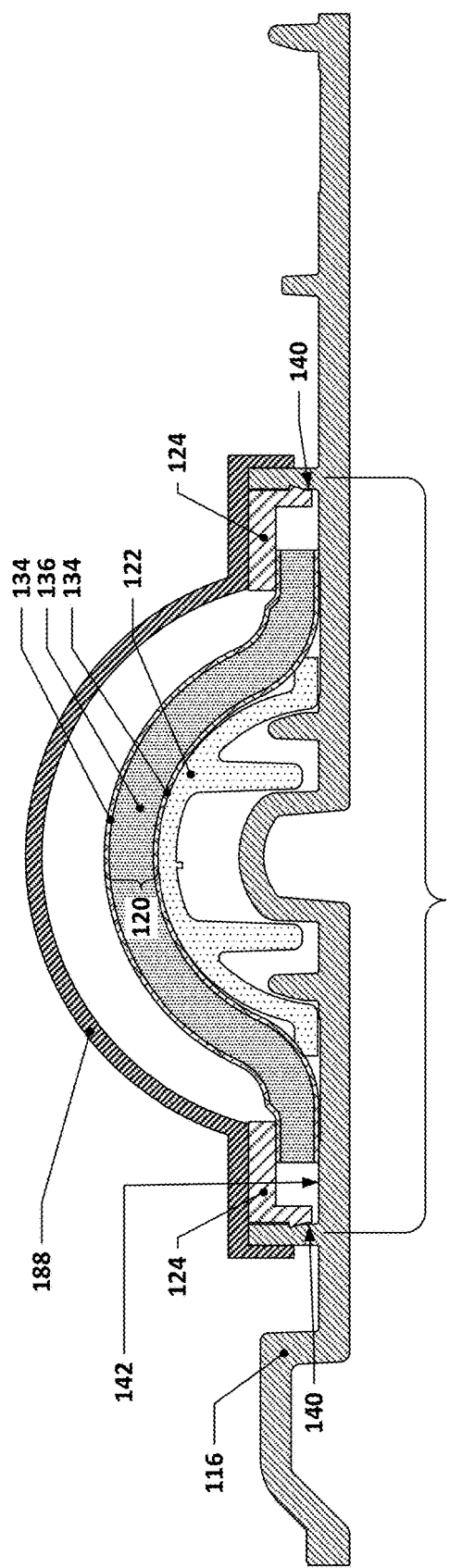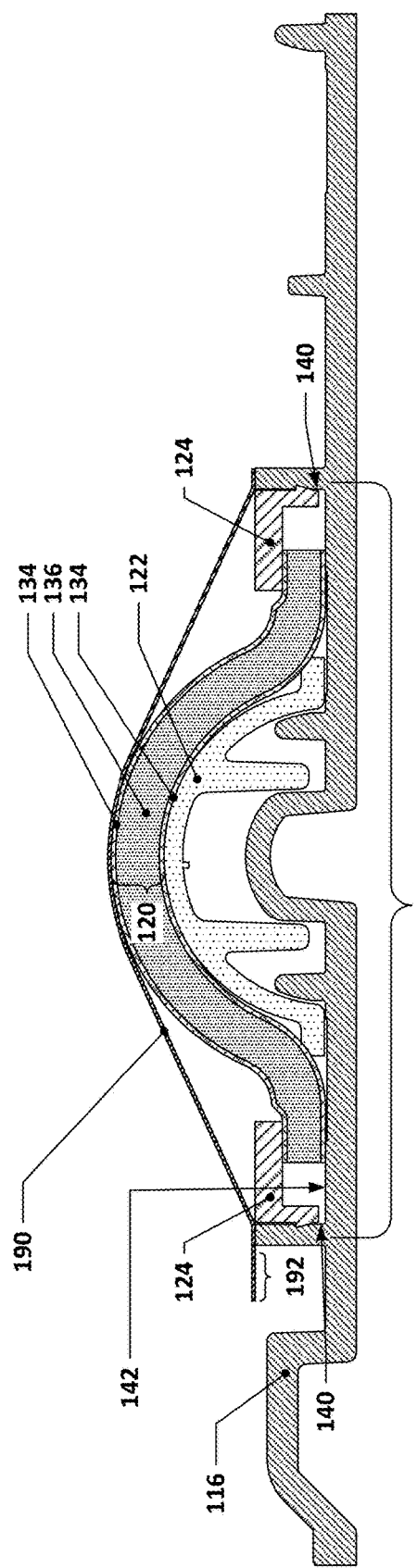

OPTICAL CLEANING CARTRIDGE

CROSS-REFERENCE TO RELATED APPLICATIONS

This application claims benefit of priority under 35 U.S.C. § 119(e) to U.S. Provisional Patent Application No. 62/655,777, filed Apr. 10, 2018, and titled "OBJECTIVE CLEANING CARTRIDGE," and U.S. Provisional Patent Application No. 62/677,092, filed May 28, 2018, and titled "OPTICAL CLEANING CARTRIDGE," which are both hereby incorporated by reference herein in their entireties.

BACKGROUND

In various optically-based analysis units or instruments, such as microscopic imagers, DNA sequencers, and other laboratory equipment, samples may be provided in, or flowed through, removable cartridges that are positioned in the field of view of an optical sensor with various optical components, e.g., lenses, filters, etc. Such removable cartridges may be received and supported by a cartridge receiver, e.g., a mechanical interface that engages with the removable cartridge, secures the removable cartridge in place, and provides mechanical, electrical, and/or fluidic interfaces by which the analysis unit can interface with the removable cartridge.

SUMMARY

Details of one or more implementations of the subject matter described in this specification are set forth in the accompanying drawings and the description below. Other features, aspects, and advantages will become apparent from the description, the drawings, and the claims.

In some implementations, an apparatus may be provided for cleaning an optical component in an analysis unit that is configured to analyze, using the optical component, samples that are located in a removable cartridge during analysis. The apparatus in such implementations may include a cleaning cartridge frame that is configured to be receivable by and supported by a cartridge receiver of the analysis unit that is configured to receive and support the removable cartridge. The apparatus may also include one or more optical cleaning assemblies, each optical cleaning assembly including an absorbent cleaning pad and a compliant support structure that is proud of a surface of the cleaning cartridge frame and interposed between the cleaning cartridge frame and at least a portion of the cleaning pad.

In some implementations of the apparatus, the compliant support structure may include an elastomeric material and may have a first portion that is a domed shape. In some such implementations, the domed shape may have a radius that at least substantially matches a radius of curvature of a surface of the optical component that faces towards the cleaning cartridge frame when the apparatus is supported by the cartridge receiver.

In some implementations of the apparatus, the absorbent cleaning pad may be a laminate including a microfiber layer and a foam layer interposed between the microfiber layer and the compliant support structure.

In some implementations of the apparatus, the cleaning cartridge frame may have a corresponding optical cleaning assembly well for each optical cleaning assembly, each corresponding optical cleaning assembly well may have one or more sidewalls and a floor, and each optical cleaning assembly may be located in the corresponding optical cleaning assembly well.

In some implementations of the apparatus, each optical cleaning assembly may further include a corresponding cover plate that is sized to at least extend to the sidewalls of the corresponding optical cleaning assembly well, each cover plate may have an aperture sized to allow the compliant support structure of the corresponding optical cleaning assembly to protrude through the cover plate, and at least a portion of the absorbent cleaning pad for each optical cleaning assembly may be sandwiched between the corresponding cover plate for the optical cleaning assembly and the cleaning cartridge frame.

In some implementations of the apparatus, the apparatus may further include one or both of an alcohol detection sensor or a liquid detection sensor. Such a sensor may be positioned so as to detect, respectively, alcohol or liquid, present in the optical cleaning assembly well.

In some implementations of the apparatus, at least a portion of the absorbent cleaning pad may include an indicator that causes the portion of the absorbent cleaning pad to change color when exposed to a liquid. In some implementations, the color change may occur when the portion is exposed to isopropyl alcohol rather than just a generic liquid.

In some implementations of the apparatus, there may be one optical cleaning assembly, two optical cleaning assemblies, three optical cleaning assemblies, four optical cleaning assemblies, or more than four optical cleaning assemblies.

In some implementations of the apparatus, the apparatus may include a re-use prevention mechanism such as a radio-frequency identification tag, a bar code, a quick response (QR) code, a serial number, and/or a near field communication tag.

In some implementations, a kit may be provided that includes one of the apparatuses as well as a container of liquid cleaning agent, a syringe, and/or a pipette.

In some implementations, a method may be provided that includes a) obtaining any of the apparatuses or the kit discussed above, b) applying a liquid cleaning agent to the absorbent cleaning pad of a first optical cleaning assembly of the one of the one or more optical cleaning assemblies, c) installing the apparatus into a cartridge receiver of an analysis unit, d) controlling the analysis unit to cause relative vertical translation between the cartridge receiver and an optical component of the analysis unit such that the optical component of the analysis unit and the absorbent cleaning pad of the first optical cleaning assembly come into contact with one another and such that the absorbent cleaning pad of the first optical cleaning assembly and the compliant support structure of the first optical cleaning assembly are compressed by a first amount, and e) controlling the analysis unit to cause relative horizontal translation between the cartridge receiver and the optical component so as to cause the absorbent cleaning pad of the first optical cleaning assembly to clean the optical component.

In some implementations of the method, (e) may include controlling the analysis unit to cause relative horizontal translation between the cartridge receiver and the optical component in a bowtie (⋈) pattern or a lemniscate (∞) pattern for one or more times.

In some implementations of the method, the apparatus may be an apparatus having an absorbent cleaning pad that includes an indicator that causes the portion of the absorbent cleaning pad to change color when exposed to, in some implementations, liquid or, in other implementations, alcohol, and the method may further include controlling the analysis unit to cause the analysis unit to obtain imaging data of the absorbent cleaning pad of the first optical cleaning assembly prior to (d) or (e), and determining that the liquid cleaning agent has been applied to the absorbent cleaning pad of the first optical cleaning assembly based on a color detected in the imaging data.

In some implementations of the method, the method may further include controlling the analysis unit to cause the analysis unit to obtain imaging data of the absorbent cleaning pad of the first optical cleaning assembly prior to (d) or (e), and determining that the liquid cleaning agent has been applied to the absorbent cleaning pad of the first optical cleaning assembly based on reflectivity of the absorbent cleaning pad measured from the imaging data.

In some implementations of the method, the apparatus may have a sensor as discussed above, and the method may further include controlling the analysis unit to obtain a sensor reading from the at least one sensor prior to (d) or (e).

In some implementations, an analysis unit may be provided that includes an optical sensor head including an optical component, a cartridge receiver configured to receive and support a removable cartridge, and a controller including one or more processors and a memory. The one or more processors may be communicatively connected with the memory, and the memory may store instructions for controlling the one or more processors to: a) determine that an apparatus of any one of claims 1 through 10 has been installed in the cartridge receiver, b) cause relative vertical translation between the cartridge receiver and the optical component such that the optical component and the absorbent cleaning pad of a first optical cleaning assembly of the one or more optical cleaning assemblies of the apparatus come into contact with one another and such that the absorbent cleaning pad of the first optical cleaning assembly and the compliant support structure of the first optical cleaning assembly are compressed by a first amount, and c) cause relative horizontal translation between the cartridge receiver and the optical component so as to cause the absorbent cleaning pad of the first optical cleaning assembly to clean the optical component.

In some implementations of the analysis unit, the apparatus may be an apparatus with a re-use prevention mechanism, and the memory may further store instructions for controlling the one or more processors to further cause the analysis unit to: obtain data from the re-use prevention mechanism, determine whether the apparatus is authorized to be used based on the data, and perform (b) and (c) only when the apparatus is determined to be authorized for use.

In some implementations of the analysis unit, the memory may further store instructions for controlling the one or more processors to further cause, as part of (c), relative horizontal translation between the cartridge receiver and the optical component in a bowtie (⋈) pattern or a lemniscate (∞) pattern for one or more times.

In some implementations of the analysis unit, the apparatus may include an indicator that causes a portion of the absorbent cleaning pad to change color when exposed to liquid or, in some implementations, to alcohol. In such implementations, the memory may further store instructions for controlling the one or more processors to further cause the analysis unit to obtain imaging data of the absorbent cleaning pad of the first optical cleaning assembly prior to (b) or (c), and determine that a liquid cleaning agent has been applied to the absorbent cleaning pad of the first optical cleaning assembly based on a color detected in the imaging data.

In some implementations of the analysis unit, the memory may further store instructions for controlling the one or more processors to further cause the analysis unit to obtain imaging data of the absorbent cleaning pad of the first optical cleaning assembly prior to (b) or (c) and determine that a liquid cleaning agent has been applied to the absorbent cleaning pad of the first optical cleaning assembly based on reflectivity of the absorbent cleaning pad measured from the imaging data.

In some implementations of the analysis unit, the apparatus may have an alcohol detection sensor or a liquid detection sensor and the memory further may store instructions for controlling the one or more processors to further cause the analysis unit to obtain a sensor reading from the at least one sensor prior to (b) or (c) and determine that a liquid cleaning agent has been applied to the absorbent cleaning pad of the first optical cleaning assembly based on the sensor reading.

BRIEF DESCRIPTION OF THE DRAWINGS

The various implementations disclosed herein are illustrated by way of example, and not by way of limitation, in the figures of the accompanying drawings, in which like reference numerals refer to similar elements.

FIG. 4 depicts a side section view of the example cleaning cartridge of FIG. 4.

FIG. 4' depicts detail view of the portion of FIG. 4 that is bounded by the dash-dot-dash rectangular border.

FIG. 12 depicts a cross-section of an example optical cleaning cartridge insert with a sealing cap.

FIG. 13 depicts a cross-section of an example optical cleaning cartridge insert with a sealing membrane.

FIGS. 1 through 10 are drawn to scale within each Figure, although not necessarily to the same scale from Figure to Figure. It is to be understood that the disclosure is not limited to the implementations depicted in the Figures (in particular, the disclosure is not limited to the few detailed examples depicted herein), and that other implementations consistent with the disclosure herein are also considered to be within the scope of this disclosure.

DETAILED DESCRIPTION

As discussed above, various optically-based analysis units or instruments, such as microscopic imagers, DNA sequencers, and other laboratory equipment, may be equipped to receive removable cartridges that may contain or receive samples, e.g., samples that are flowed through the cartridges, that are positioned in the field of view of an optical sensor with various optical components, e.g., lenses, filters, etc. Such removable cartridges may be received and supported by a cartridge receiver, e.g., a mechanical interface that engages with the removable cartridge, secures the removable cartridge in place, and provides mechanical, electrical, and/or fluidic interfaces by which the analysis unit can interface with the removable cartridge.

Figure 1:
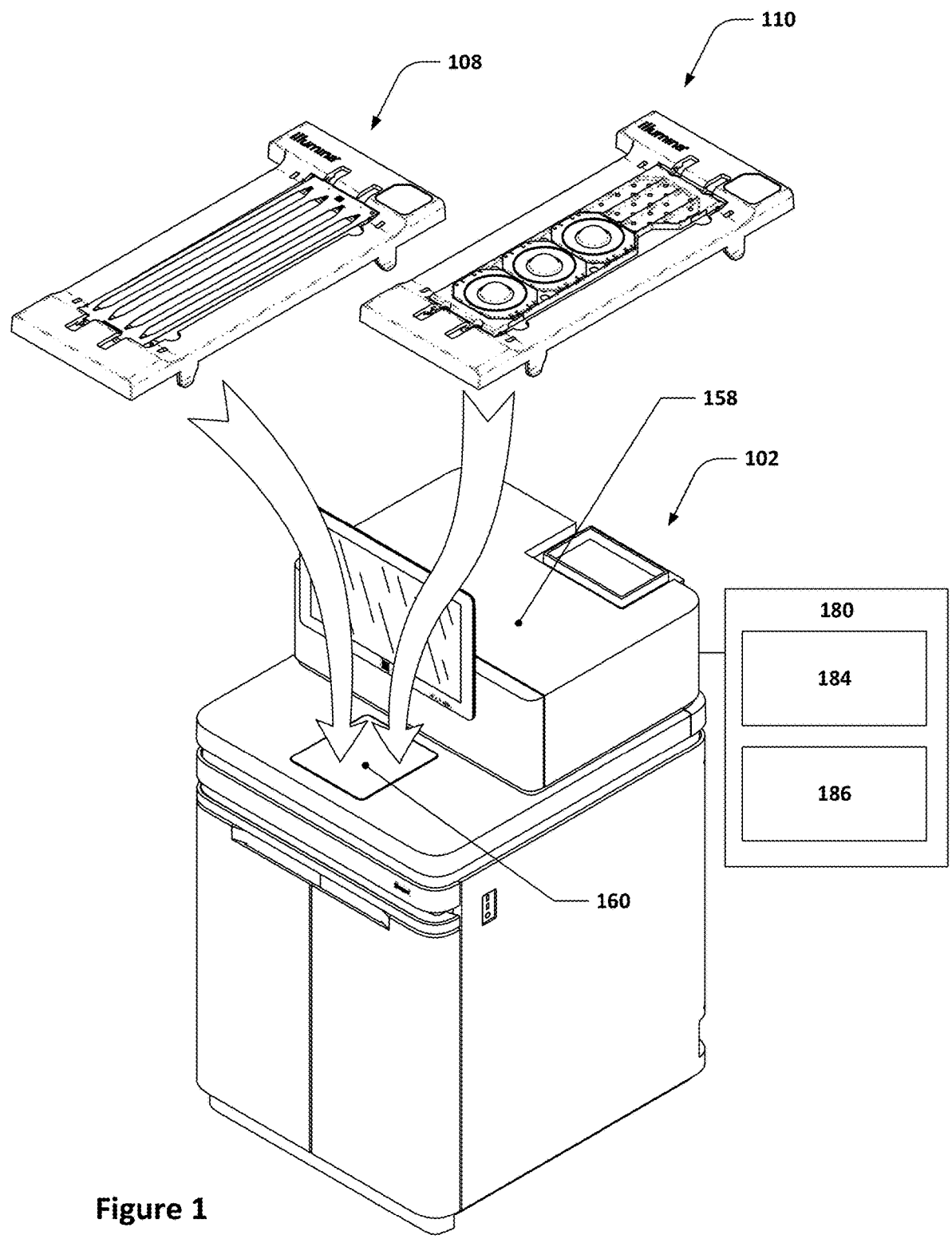
FIG. 1 depicts an example analysis system as well as an example removable cartridge and an example optical cleaning cartridge that may be used with the analysis system.

FIG. 1 depicts an example analysis system or unit as well as an example removable cartridge and an example optical cleaning cartridge that may be used with the analysis system. The example analysis unit 102 may have an optical sensor head 158 (shown here encased in a housing) that may include one or more optical sensors that may be configured to scan portions of a removable cartridge 108, which, in this example, is a microfluidic flow cell. The removable cartridge 108 may, for example, be inserted into a cartridge receiver of the analysis unit 102 that is located beneath a door 160; during use, the door 160 may slide out of the way, allowing the removable cartridge to be inserted and placed into the cartridge receiver. The cartridge receiver may then be translated underneath the optical sensor head 158 in order to allow portions of the removable cartridge to be scanned/imaged by the optical sensor head 158.

The analysis unit 102 may include, for example, a controller 180 that may include one or more processors 184 and a memory 186. The one or more processors 184 and the memory 186 may be operatively connected with one another and with, for example, the optical sensor head, and may be configured to cause the analysis unit to perform various actions or operations, such as loading a cartridge, performing cleaning operations, checking optical component cleanliness, and/or verifying the use status of an optical cleaning cartridge. In many implementations, the memory 186 may store instructions that may be executed by the one or more processors 184 to cause the one or more processors 184 to perform various actions or cause various actions to occur.

In some instances, contaminants may build up on the optical components of the optical sensor(s), especially on the surfaces of such components that are closest to the removable cartridge 108 (and thus exposed to ambient air).

FIG. 1 also depicts an example optical cleaning cartridge 110, which is designed to be used in the same analysis unit 102. The example optical cleaning cartridge 110 therefore has a similar overall form factor, allowing it to be inserted into the analysis unit 102 in the same manner as the removable cartridge 108 and used to clean contaminants off of the optical components. Such an optical cleaning cartridge may be used in such analysis systems to reliably, quickly, and safely clean such contaminants off of such optical components. Such cleaning cartridges may be used in place of manual cleaning operations that may introduce variation due to variations in how different people perform the operation and even how the same person performs the operation from one cleaning to the next. In the context of an analysis unit such as analysis unit 102, in which the optical sensor is enclosed by a housing, manual cleaning operations may also require removal of a housing and/or other components in order to allow technician access to the optical component(s).

The optical cleaning cartridge concepts discussed herein are compatible with the interfaces of analysis instruments that receive and support removable cartridges used by such analysis instruments during normal (non-cleaning) analysis operations, and are not limited to just the embodiment(s) shown. It will be understood that similar concepts may be implemented in the context of other types of cartridge-based systems.

Figure 2:
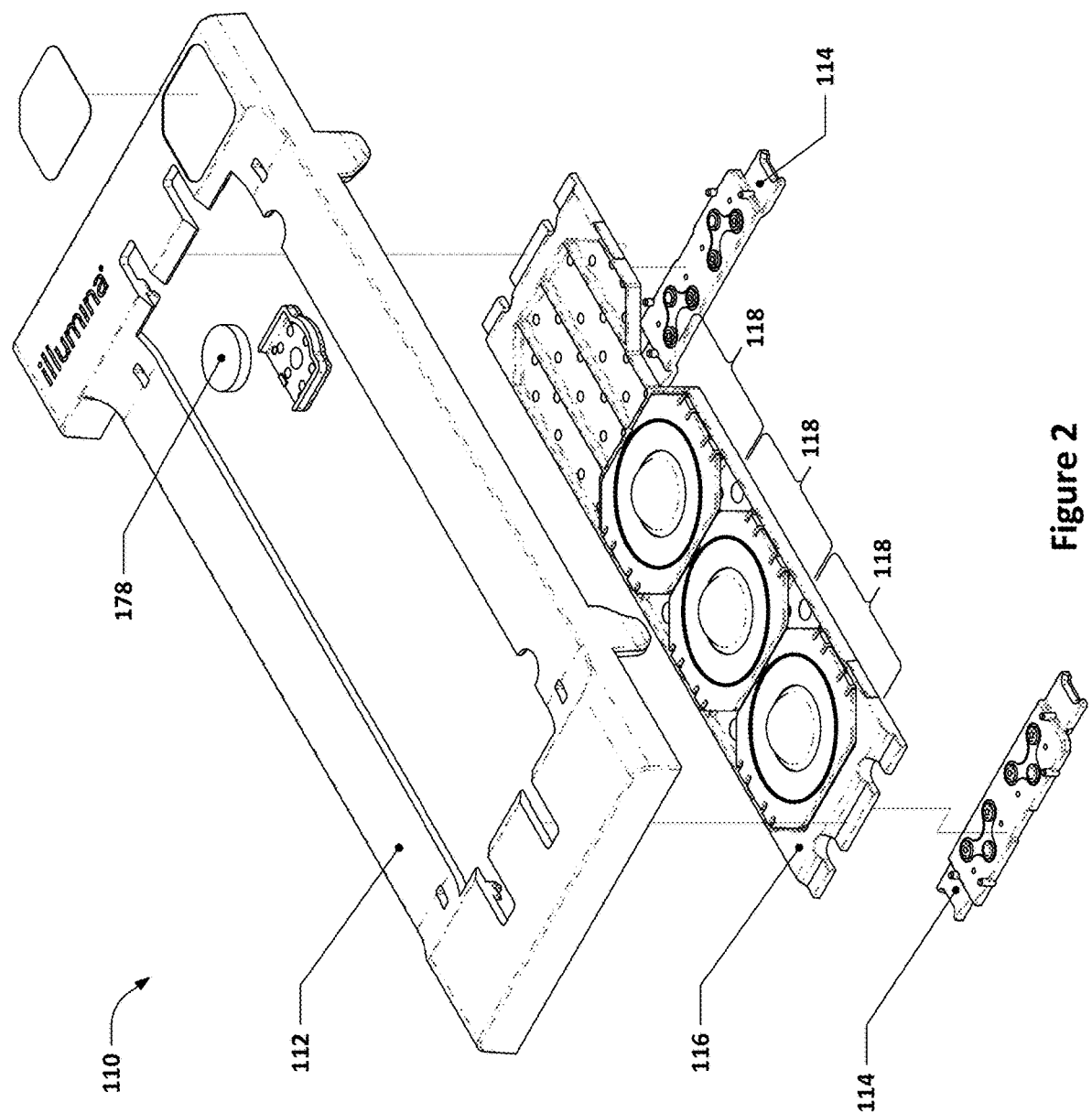
FIG. 2 depicts an isometric exploded view of the example optical cleaning cartridge of FIG. 1.

FIG. 2 depicts an isometric exploded view of the example optical cleaning cartridge of FIG. 1. In the depicted example, the optical cleaning cartridge 110 includes a cleaning cartridge frame 112 that is substantially similar or identical to a cartridge frame used for the removable cartridges. For example, in some instances, a removable cartridge may include a plastic exterior cleaning cartridge frame 112 that supports a glass microfluidic plate or similar structure within the bounds of the plastic exterior cleaning cartridge frame 112; such a plate may be held in place in the frame by brackets 114, for example. An optical cleaning cartridge 110 for an analysis unit 102 that is designed to use such a cartridge may, in some instances, use the exact same type of plastic exterior cleaning cartridge frame 112, but may replace the glass microfluidic plate or similar structure with an insert 116 that includes optical cleaning assemblies 118 and, optionally, optical cleaning assembly wells as discussed later herein. In other implementations, the cleaning cartridge frame 112 and the insert 116 that includes the optical cleaning assemblies 118 may be integrated into a single component. In either case, the portion of the cleaning cartridge frame 112 that interfaces with the cartridge receiver of the analysis unit 102 may be designed to be compatible with the cartridge receiver. In some implementations, the optical cleaning cartridge 110 may include a re-use prevention mechanism 178, e.g., a radio-frequency identification (RFID) tag, a near-field communications (NFC) tag, a machine-readable serial number, a bar code, a quick response (QR) code, or other identifier that may be read by the analysis unit 102 and used to identify the optical cleaning cartridge 110 in question and determined if the optical cleaning cartridge 110 should be used. In FIG. 2, the re-use prevention mechanism 178 is an RFID tag, although other mechanisms may be used depending on the particular type of analysis unit.

Thus, the optical cleaning cartridges discussed herein may be able to be inserted into an existing analysis unit with little or no additional effort than is needed to insert/install a removable cartridge for normal analysis operations.

Figure 3:
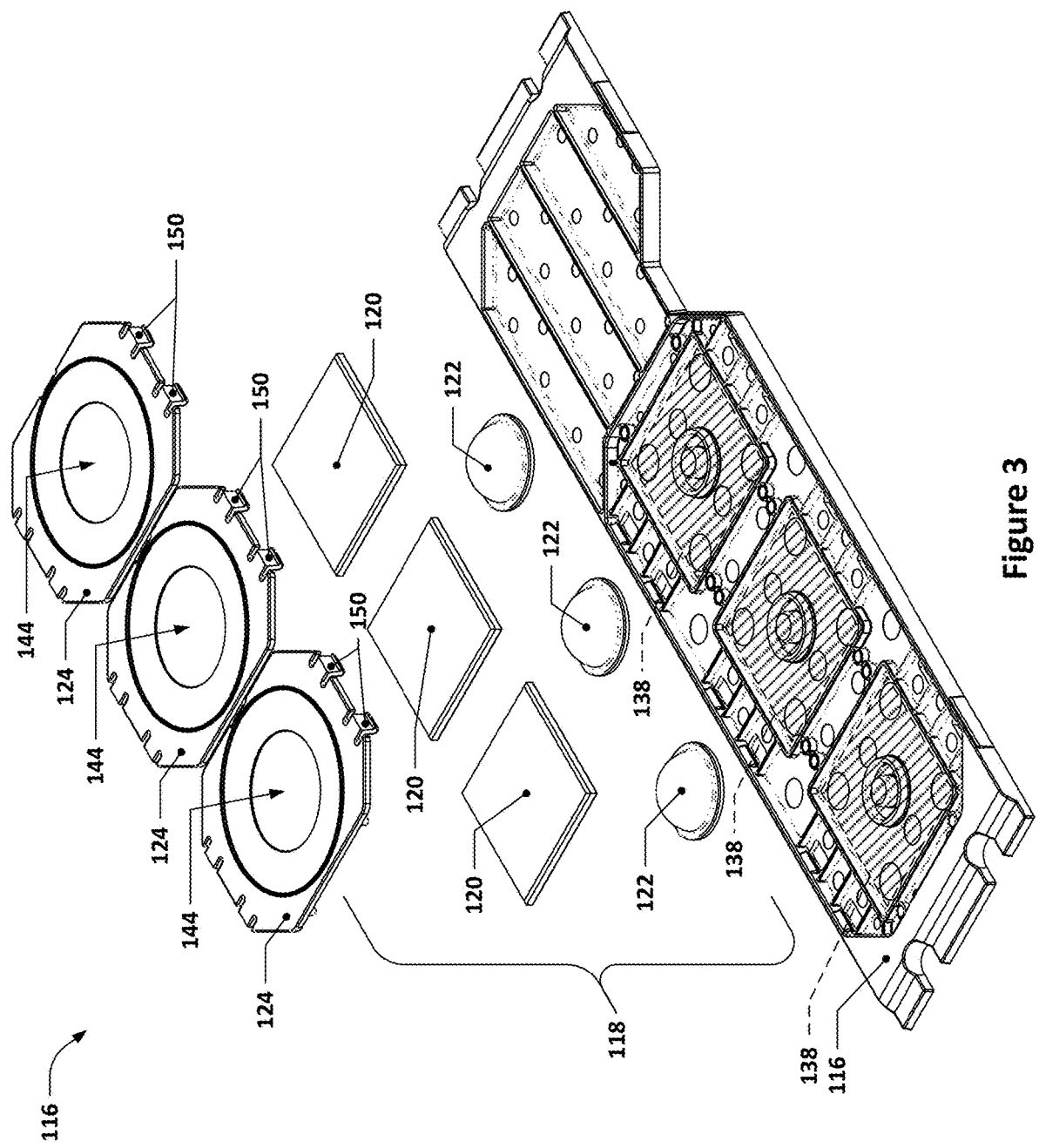
FIG. 3 depicts an isometric exploded view of an example insert for the example cleaning cartridge of FIG. 2.

FIG. 3 depicts an isometric exploded view of the example insert 116 for the example cleaning cartridge of FIG. 2. The insert 116 may include one or more (in this example, three) optical cleaning assemblies 118, each of which may be seated in an optical cleaning assembly well 138.

Each optical cleaning assembly 118 may include an absorbent cleaning pad 120 and a compliant support structure 122 that are ultimately supported by the cleaning cartridge frame 112 and/or the insert 116. The absorbent cleaning pad 120 for each optical cleaning assembly 118 may be sandwiched between the corresponding optical cleaning assembly well 138 and a cover plate 124 that may, for example, snap onto features near the optical cleaning assembly well 138 using clips 150, or may attach using other mechanisms. In some implementations, the absorbent cleaning pad 120 and compliant support structure 122 may be retained in place using structures other than the depicted cover plates 124.

Each cover plate 124 may, for example, interface with a respective optical cleaning assembly well 138, e.g., the cover plate may have walls that nestle inside of (or outside of) walls or surfaces that define an optical cleaning assembly well so that when the cover plate 124 is mounted to the optical cleaning cartridge 110, the cover plate 124 helps further close off the optical cleaning assembly well 138 and prevent leaks of liquid from the optical cleaning assembly well 138. Each cover plate 124 may, for example, have an aperture 144 that is sized to permit a corresponding compliant support structure 122 and absorbent cleaning pad 120 to protrude through the cover plate 124. The cover plate 124 and remaining structures of the optical cleaning cartridge 110 may be fastened or connected together to sandwich and clamp a portion of the absorbent cleaning pad 120 and/or the compliant support structure 122 in place relative to the optical cleaning cartridge 110.

FIG. 4 depicts a side section view of the example optical cleaning cartridge 110 of FIG. 4. FIG. 4' depicts detail view of the portion of FIG. 4 that is bounded by the dash-dot-dash rectangular border.

In some implementations, as can be seen in FIG. 4', the absorbent cleaning pad 120 may have an outermost surface or surfaces made of a material suitable for cleaning optical components, e.g., a textile layer 134, and an interior foam core 136 that is able to absorb a cleaning agent, e.g., isopropyl alcohol (IPA), that may be applied to the absorbent cleaning pad 120. A suitable example absorbent cleaning pad 120, for example, may be an absorbent cleaning pad 120 with a polyurethane fine-pore, open-celled foam core 136 that is sandwiched between two textile layers 134 of polyester microfiber textile material. The textile layer 134 of such an absorbent cleaning pad 120 facing upwards may engage directly with the optical component and may wipe off any contaminants that are present on such an optical component. The foam core 136 of such an absorbent cleaning pad 120 may act to provide a distributed compressive load on the textile layer 134, thereby helping to press the textile layer 134 against the surface of the optical component being cleaned, but may also serve as a reservoir for holding a liquid cleaning agent, such as IPA. In such implementations, the cleaning agent may be wicked (or pressed) into the textile layer 134 during use, thereby wetting the textile layer 134 and enabling for a wet clean of the optical component to be performed.

The absorbent cleaning pad 120 may be supported from below by the compliant support structure 122, which may, for example, be made of an elastomeric material that protrudes up from a surface 126 of the cleaning cartridge frame 112 and/or insert 116 so as to press the absorbent cleaning pad 120 against the optical component to be cleaned. The compliant support structure 122 may be made of a material such as silicone, rubber, or other elastomeric material. In some implementations, the compliant support structure 122 may include a rigid component, e.g., a rigid domed element, and a compliant component, e.g., a spring, that may be compressed to allow the rigid component to travel, for example, up and down. In such instances, the both the rigid component and the spring component may be thought of, in combination, as the compliant support structure 122. The compliant support structure 122 may be designed to position a portion of the absorbent cleaning pad 120 in a location that allows it to come into contact with the optical component to be cleaned when the cartridge receiver and optical element are appropriately aligned relative to one another.

In some implementations, the compliant support structure 122 may be engineered to have a domed shape 128. Such an implementation may be particularly well-suited for instances in which the optical component has a surface to be cleaned that is concave in nature. In such implementations, the curvature of the domed shape 128 may be substantially similar to the radius of curvature of the concave optical component surface. For example, the radius of curvature of the domed shape 128 in the region where the absorbent cleaning pad 120 contacts the optical component may be sized so as to have a radius that is between the radius of curvature of the concave optical component surface and the radius of curvature of the concave optical component surface minus a thickness of the absorbent cleaning pad 120 (in an uncompressed state).

As noted earlier, in some implementations, the optical cleaning assembly 118 or assemblies 118 may be located within a corresponding optical cleaning assembly well 138, e.g., a well formed by a recess in the optical cleaning cartridge 110 or by a raised wall in the optical cleaning cartridge. In either case, the optical cleaning assembly wells will have a floor 142 and one or more sidewalls 140 facing inwards towards the compliant support structure 122 that may define a leak-proof container (assuming that the optical cleaning cartridge 110 stays level and is not jostled). Such a well may not only serve to help locate features, e.g., the optical cleaning assembly 118 or components thereof, but may also serve to contain excess liquid cleaning agent that may not be absorbed by the absorbent cleaning pad 120, e.g., if too much liquid cleaning agent is applied to an absorbent cleaning pad 120 during preparation, or if the absorbent cleaning pad 120 is saturated with liquid cleaning agent and then compressed during use (in which case, some of the liquid cleaning agent may be squeezed out of the absorbent cleaning pad 120). Such optical cleaning assembly wells 138 may be sized, for example, to be able to contain at least the amount of liquid cleaning agent that is intended to be applied to each absorbent cleaning pad (for example, ~1 ml of liquid or more).

In an example analysis instrument, a removable cartridge may be supported on a chuck or other flat surface of the cartridge receiver during analysis. Portions of the removable cartridge may be clamped or otherwise secured in place during use, and the cartridge receiver may be configured to translate vertically and/or horizontally during use, e.g., to allow an optical sensor of the analysis unit to focus on different regions of the removable cartridge. In some analysis units, the optical sensor (and associated optical components) may be movable as well in vertical and/or horizontal directions (in some such instances, the cartridge receiver may be stationary with respect to directions where the optical sensor may be moved to provide for relative movement between the optical sensor and the cartridge receiver. In such systems, the optical sensor may frequently be kept above a predefined minimum height above the removable cartridge to prevent the bottommost optical component of the optical sensor from potentially colliding with the removable cartridge.

Figure 5:
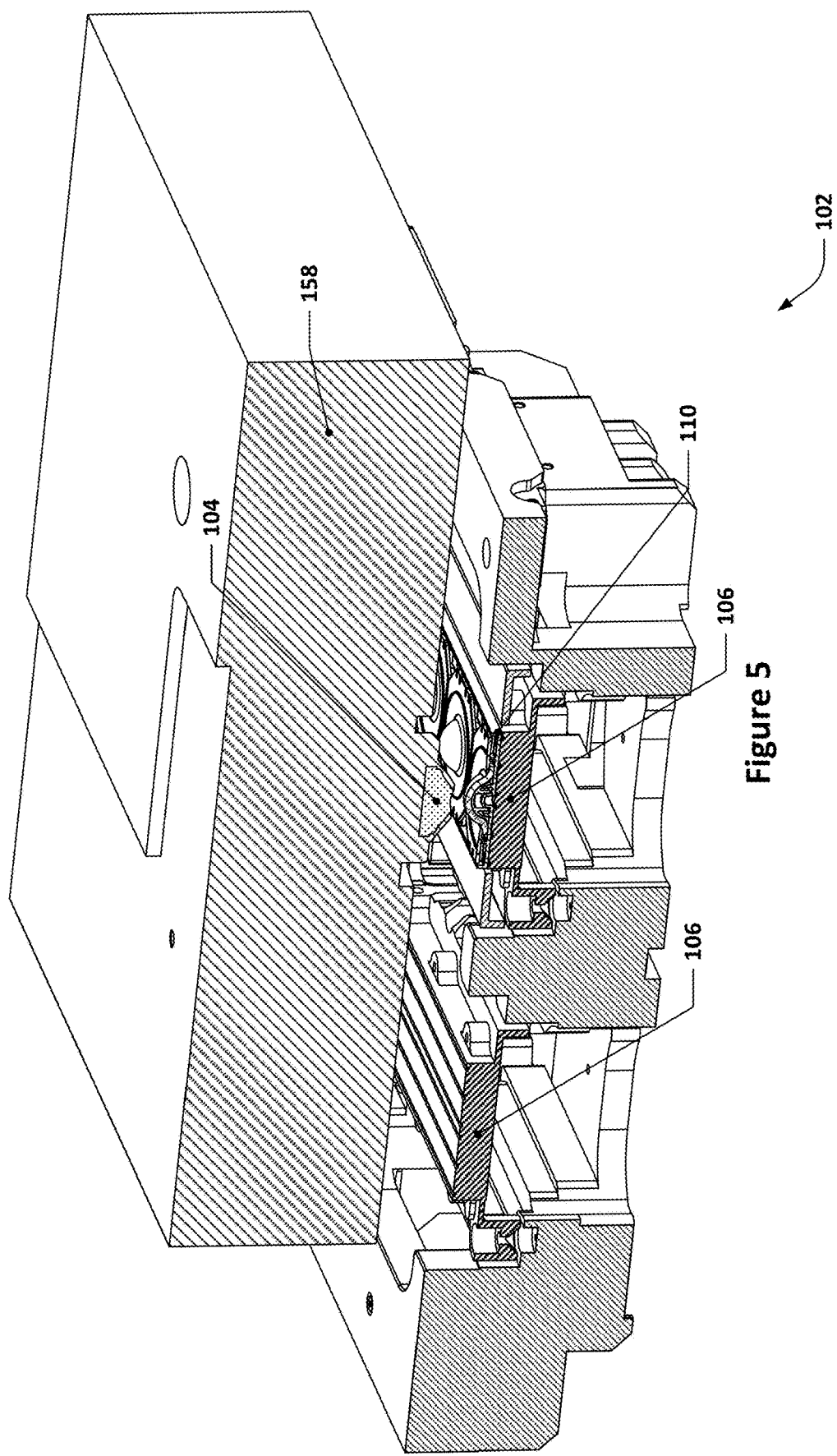
FIG. 5 depicts a perspective view of a simplified portion of the example analysis unit of FIG. 1 in a first configuration.
Figure 6:
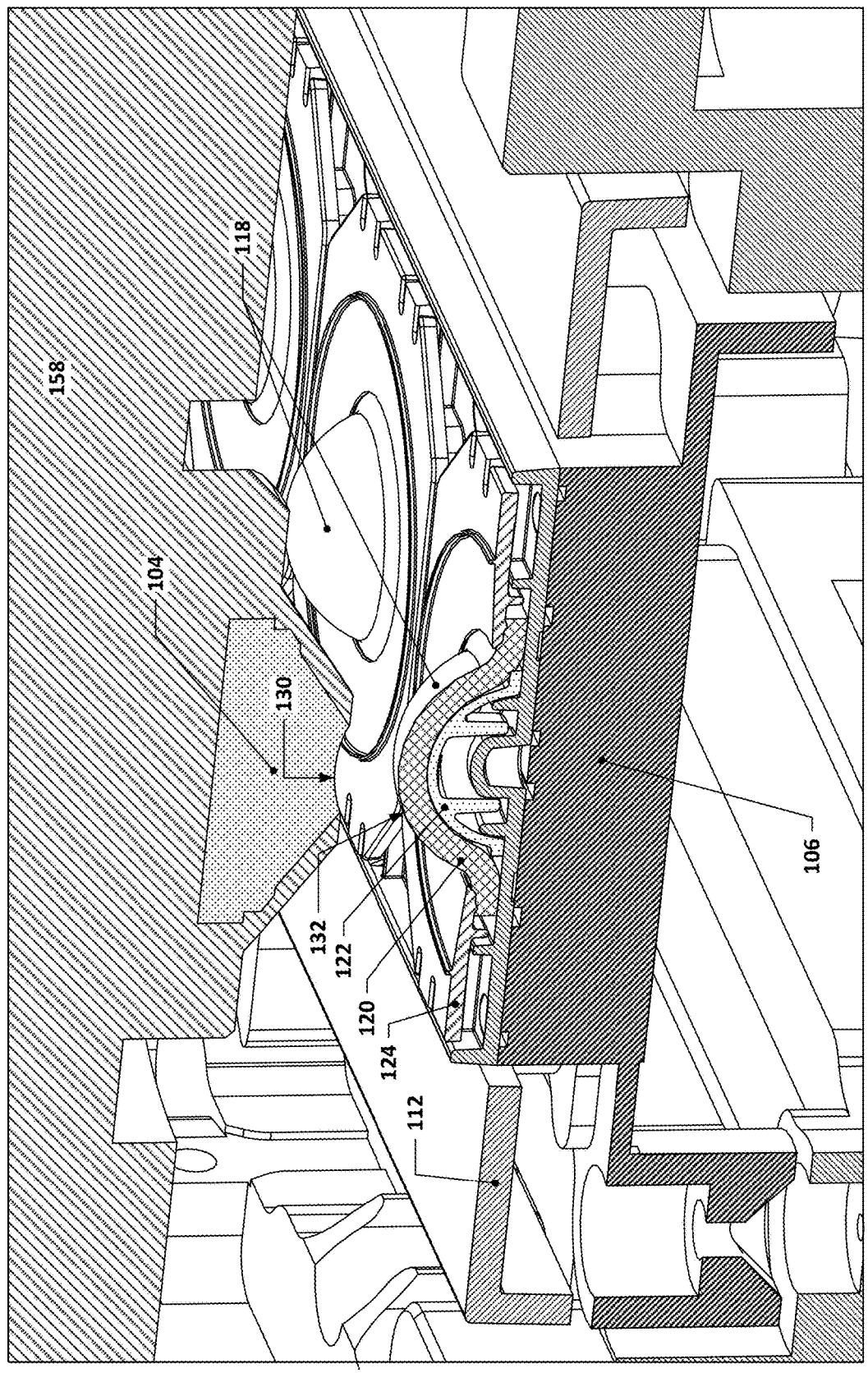
FIG. 6 depicts a detail view of a portion of FIG. 5.

FIG. 5 depicts a perspective view of a simplified portion of the example analysis unit of FIG. 1 in a first configuration. FIG. 6 depicts a detail view of a portion of FIG. 5. In this first configuration, there is a gap between an optical component 104 of the optical sensor head 158 and the absorbent cleaning pad 120 of the optical cleaning cartridge 110. In this example, the optical component has a concave surface 130, e.g., having a negative radius of curvature that generally matches the radius of curvature 132 of the domed shape of the optical cleaning assemblies 118. The optical cleaning cartridge 110 may be supported within the analysis unit 102 using a cartridge receiver 106, which may support the optical cleaning cartridge 110 from below.

Figure 7:
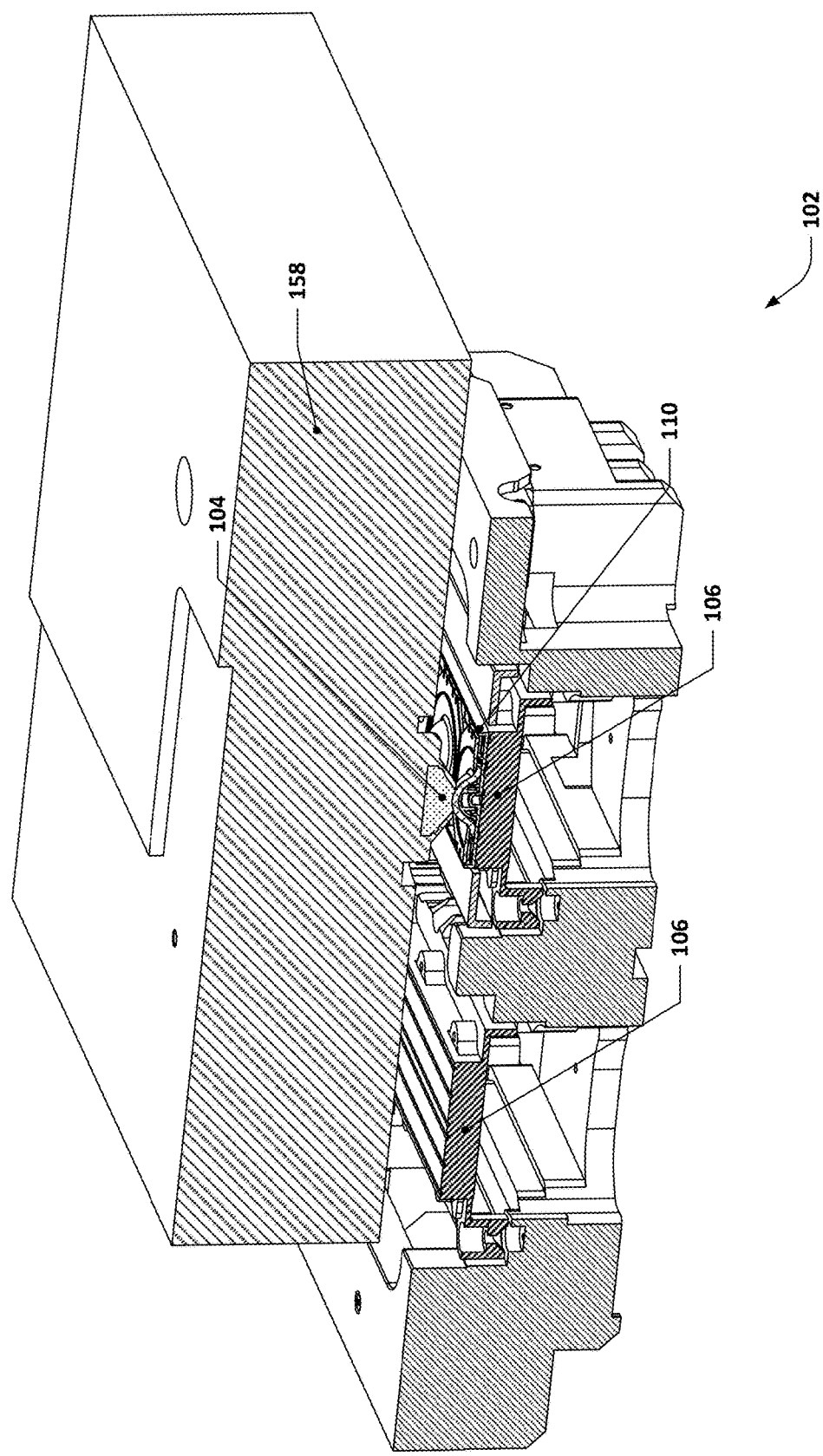
FIG. 7 depicts a perspective view of a simplified portion of the example analysis unit of FIG. 1 in a second configuration.
Figure 8:
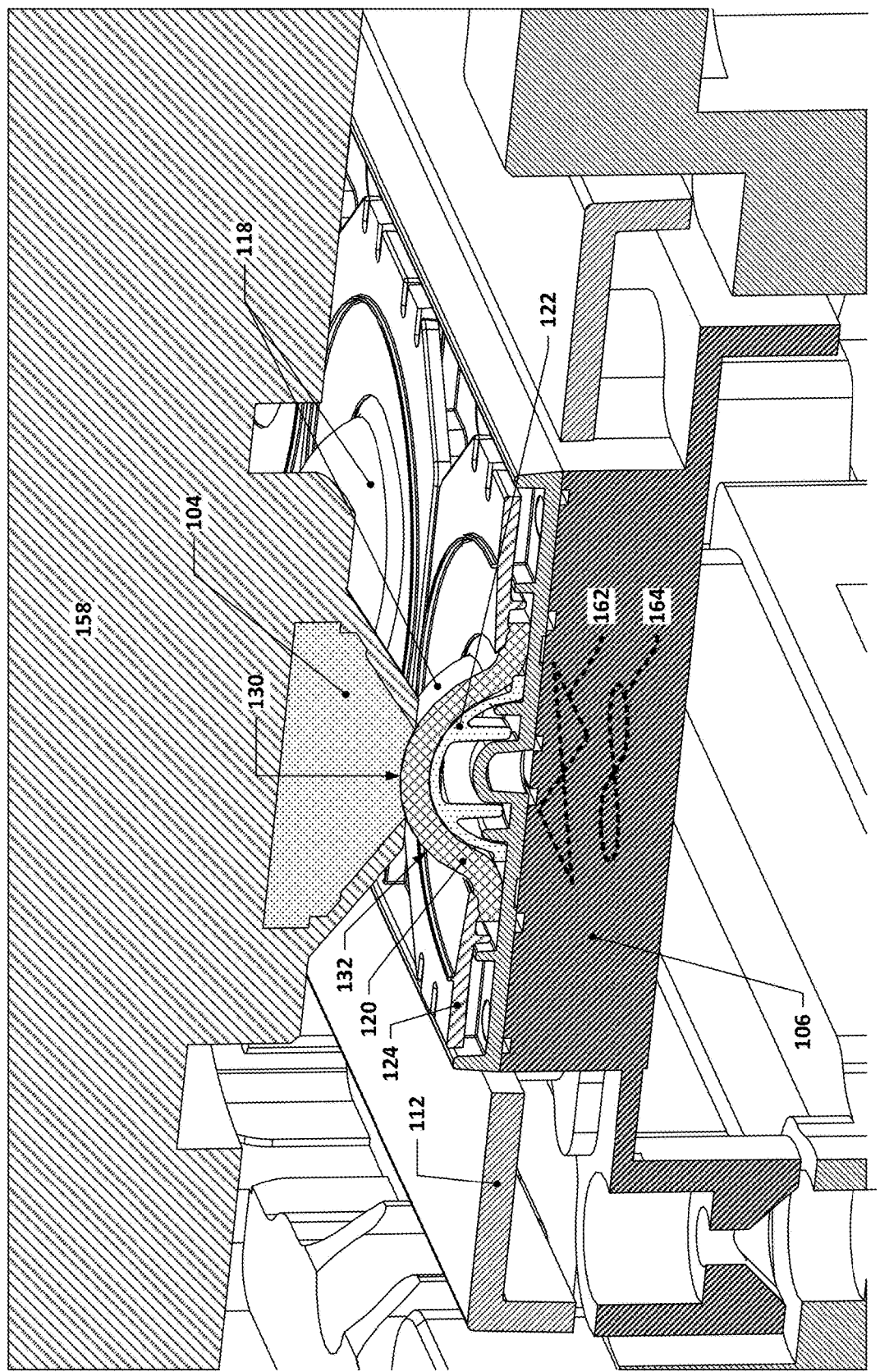
FIG. 8 depicts a detail view of a portion of FIG. 7.

FIG. 7 depicts a perspective view of a simplified portion of the example analysis unit of FIG. 1 in a second configuration. FIG. 8 depicts a detail view of a portion of FIG. 7.

During cleaning operations, the cartridge receiver 106 and the optical sensor head 158 may be moved into the second configuration, in which the absorbent cleaning pad 120 may be brought into intimate contact with the optical component 104. While in contact with the optical component 104, the absorbent cleaning pad 120 and the optical component 104 may be caused to move laterally relative to each other, e.g., in a figure-8 or lemniscate pattern 164, a bowtie pattern 162, or in any other movement pattern that causes the absorbent cleaning pad 120 to wipe across the contaminated surface of the optical component 104.

Figure 9:
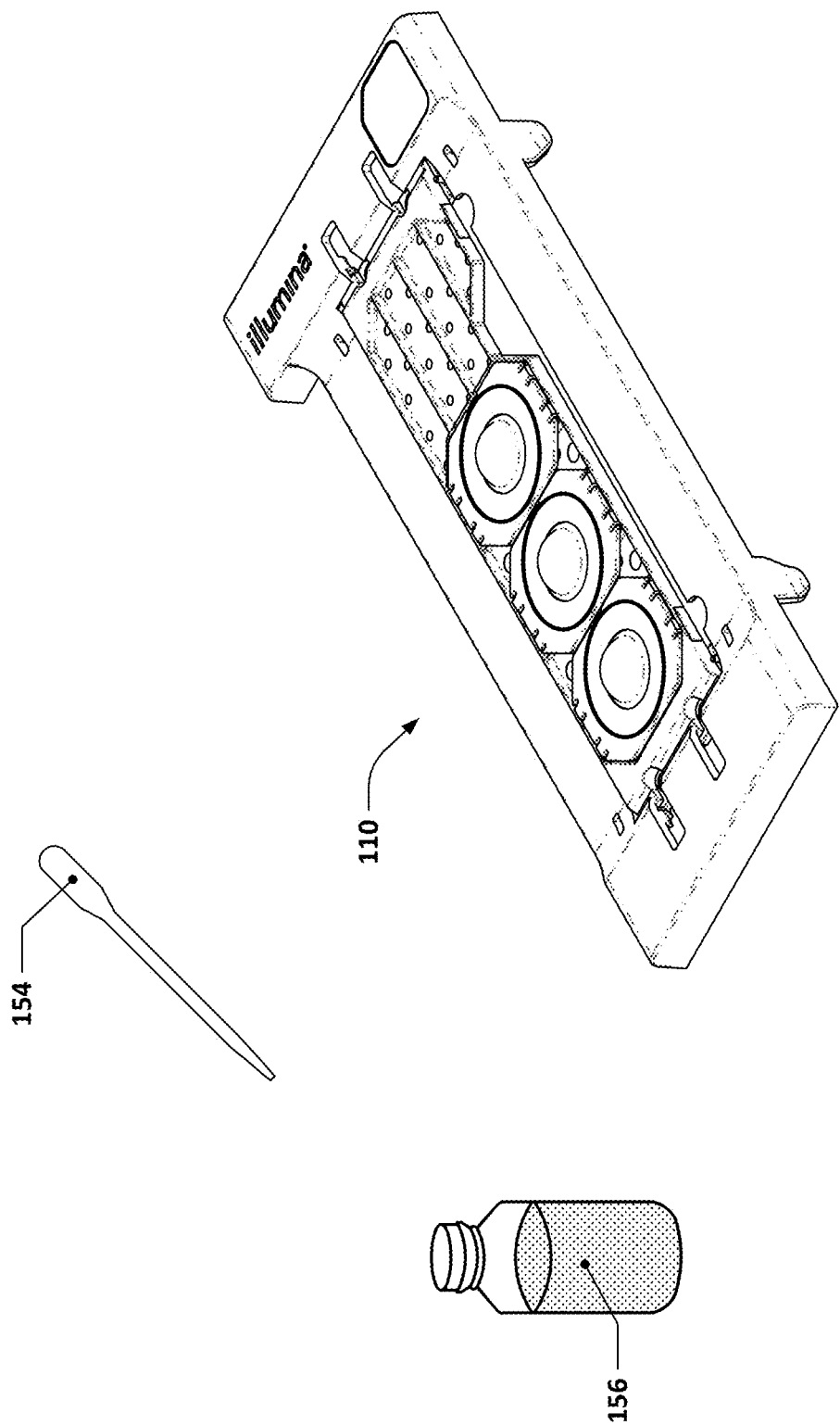
FIG. 9 depicts an example kit that includes the example optical cleaning cartridge of FIG. 1.

FIG. 9 depicts an example kit for an analysis unit that includes the example optical cleaning cartridge of FIG. 1. The kit may also include, in some implementations, a container 156 of cleaning agent, e.g., IPA or other suitable liquid, and/or a pipette 154 or some other applicator, such as a syringe, for transferring a predefined amount of the cleaning agent to each optical cleaning assembly 118. In some implementations, the kit may only include the applicator or pipette 154 and the optical cleaning cartridge 110, with the cleaning agent supplied separately, e.g., by an end user or facility where the analysis unit 102 is located. In other implementations, the kit may include the container 156 with the cleaning agent, but no applicator or pipette 154. In some such implementations, the container 156 for the cleaning agent may include a self-metering mechanism that dispenses only a predetermined amount of cleaning agent at a time. In other such implementations, the container 156 may be a simply container, with the user being responsible for monitoring the dispensation of cleaning agent to ensure that not too much cleaning agent is dispensed. In further implementations, the kit may include all three of the optical cleaning cartridge 110, the applicator or pipette 154, and the container 156 of cleaning agent.

Figure 10:
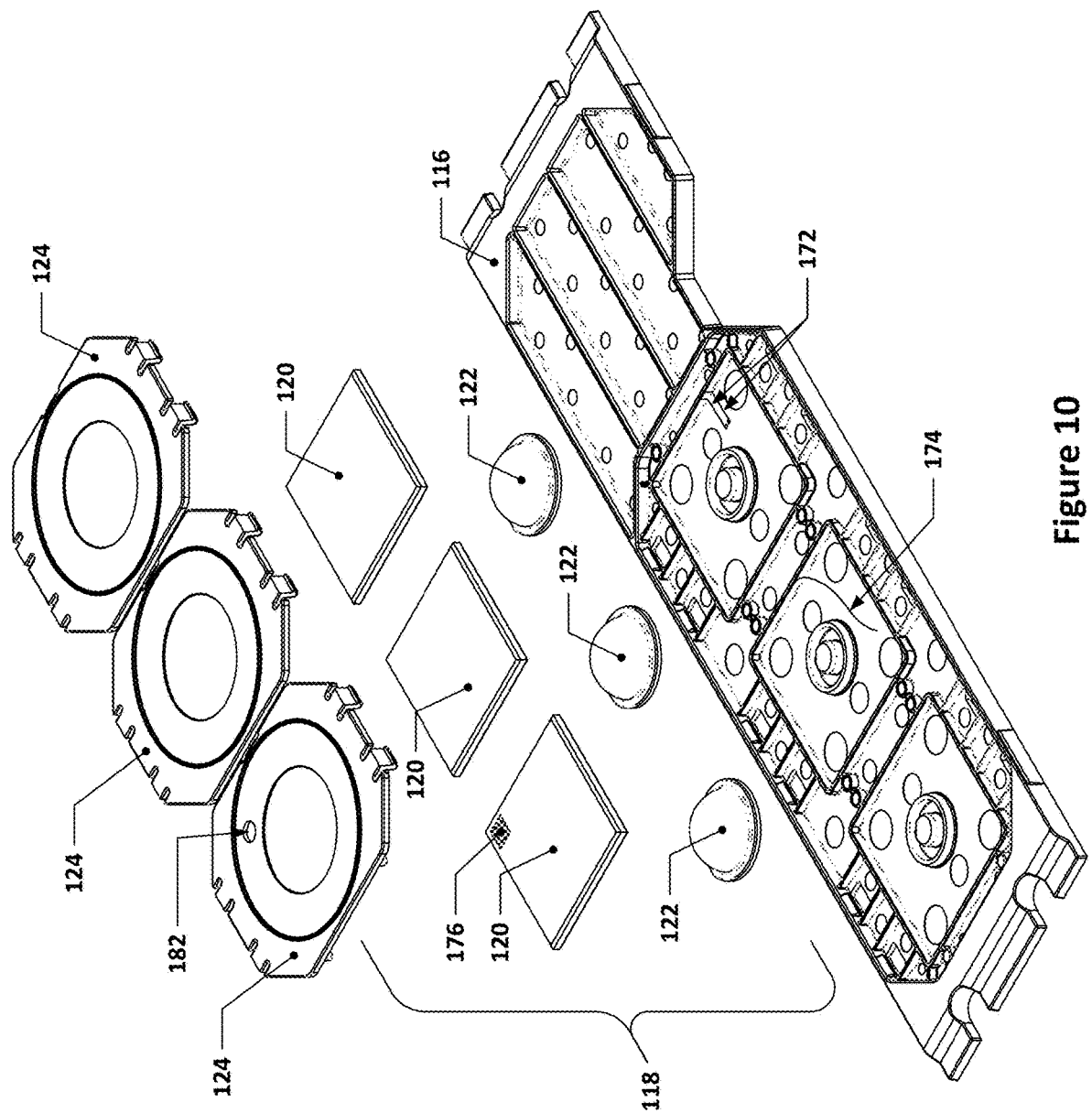
FIG. 10 depicts another exploded view of the example optical cleaning cartridge of FIG. 1 with various example sensors included.

Prior to using an optical cleaning cartridge 110, the cleaning agent, such as IPA or other suitable liquid, may be applied to the absorbent cleaning pad 120, e.g., using the pipette 154 or other applicator, such as a syringe. In some implementations, the optical cleaning cartridge 110 may include one or more features designed to allow for confirmation that the cleaning agent has been applied. For example, in some implementations, the optical cleaning cartridge may include a sensor, or components of a sensor, that may be used to detect if the cleaning agent has been applied. FIG. 10 depicts another exploded view of the example optical cleaning cartridge of FIG. 1 with various examples sensors included. In the example optical cleaning cartridge of FIG. 10, a different type of sensor is implemented in each optical cleaning assembly 118 for the purposes of facilitating discussion. However, in practice, the same type of optical cleaning assembly 118 would, if such sensors are used, likely be the same for each optical cleaning assembly 118 of an optical cleaning cartridge 110.

In some instances, such a sensor may be as simple as a liquid detection sensor that may check for conductivity changes between two electrodes 172 in an optical cleaning assembly well that may simultaneously be in contact with liquid, such as the cleaning agent, if the liquid is present. A circuit may be configured to monitor such electrodes 172 and detect changes in conductivity between them that may result from the presence of a liquid bridge between them. Such electrodes 172 may be monitored by a circuit that resides on the optical cleaning cartridge 110 or may, for example, simply be conductive traces and/or wires that are routed to locations on the optical cleaning cartridge 110 where they can interface with electrically conductive contacts of the analysis unit 102 that may monitor the electrodes 172 for such changes in electrical characteristics.

In other instances, the sensor may be more discriminating and may be able to detect not only the presence of a cleaning agent, but whether the cleaning agent is the desired cleaning agent. For example, an optical fiber 174 located in an optical cleaning assembly well 138 may be equipped with a particular optical coating that swells when exposed to IPA and changes its refractive index as a result; such refractive index changes may be detectable and may serve as a mechanism for determining that IPA is present in the optical cleaning assembly well 138. For example, a polycarbonate optical fiber may be coated (after removing any cladding layer) with a polystyrene layer, which may swell when exposed to alcohol. The analysis unit with which the optical cleaning cartridge is used may interrogate such optical fiber sensors to determine if the optical cleaning cartridge 110 has been properly prepared with cleaning agent such as IPA prior to initiating cleaning operations with the optical cleaning cartridge 110. If not, the analysis unit 102 may be configured to display an error message and to refuse to initiate cleaning operations.

In some other implementations, sensor for detecting the application of the cleaning agent may take the form of a chemical-based indicator 176 that may, for example, change color when exposed to the cleaning agent. Such a chemical indicator 176 may be provided, for example, in portions of the absorbent cleaning pad near the base of the compliant support structure so that such chemicals are not proximate to the top of the compliant support structure 122 that will be used to apply pressure to the absorbent cleaning pad 120 that contacts the optical component (to prevent incidental contamination of the optical component with the indicator). In some implementations, the cover plate 124 may include a port 182 that allows the indicator 176 to be seen if it would otherwise be obscured from view.

For example, potassium dichromate may undergo a reduction reaction when exposed to IPA that causes it to turn from a yellow color to a pale blue color. Depending on the cleaning agent selected, other chemical indicators could be used to similar effect. Such a color change may be observed by a human operator or may, in some cases, be detected by the analysis unit. For example, the analysis unit 102 may align the optical sensor that is to be cleaned with the portion of the optical cleaning cartridge 110 that has the chemical indicator 176 and may obtain image data that allows for the color of the imaged region to be identified—if the color is not the expected color that would result from the liquid cleaning agent being present, then the analysis unit 102 may generate an error message and may require that the cleaning agent be added before continuing cleaning operations.

In some instances, there may be no sensor used on the optical cleaning cartridge 110, but the analysis unit 102 may simply attempt to detect the presence of a liquid in the optical cleaning cartridge 110 using data from the optical sensor. For example, if the absorbent cleaning pad 120 includes a white or pale microfiber textile layer 134 and a darker-colored foam core 136, e.g., gray, dark gray, blue, dark blue, red, etc., the exterior textile layer 134 may appear much darker when wet due to the liquid acting as a light pipe to the darker foam core 136 (for example, when light-colored cloth gets wet, it appears darker and allows for darker colored objects beneath the cloth to be more visible). In such instances, the analysis unit 102 may obtain image data of the absorbent cleaning pad 120 and compare the average color of the absorbent cleaning pad 120 against a range of values that have been predetermined to be indicative of the absorbent cleaning pad 120 being in a "wet" state. If the absorbent cleaning pad 120 does not appear "wet" in view of such information, the analysis unit 102 may generate an error message and may require that the cleaning agent be added before continuing cleaning operations.

Alternatively, the imaging data from the optical sensor may be analyzed to determine the level of reflectivity that is present in the absorbent cleaning pad 120; if the absorbent cleaning pad 120 is wet, it will have a higher reflectivity than if it is dry. Accordingly, if the reflectivity of the absorbent cleaning pad is not within a predetermined range of reflectivity that is deemed to be indicative of a "wet" state, then the analysis unit 102 may generate an error message and may require that the cleaning agent be added before continuing cleaning operations.

It will be understood that other cleaning cartridges and/or analysis units may be "open loop," i.e., they may have no provisions for detecting or indicating the presence or absence of a cleaning agent.

It will be understood that cleaning cartridges as discussed herein may include one or more optical cleaning assemblies. For example, a cleaning cartridge may include two, three, four, or even more optical cleaning assemblies. In such cases, cleaning operations may switch to unused optical cleaning assemblies at various stages during cleaning to ensure that contaminants wiped off of the optical component are not re-introduced to the optical component during later portions of the cleaning operation. In implementations with multiple optical cleaning assemblies, some or all of the components of each optical cleaning assembly may be integrated or consolidated into fewer components. For example, a single cover plate may have three apertures in it and be used to secure parts for three optical cleaning assemblies. Similarly, a single optical cleaning assembly well may be sized large enough to receive multiple optical cleaning assemblies. Additionally or alternatively, a single, long absorbent cleaning pad may be used for multiple optical cleaning assemblies. In some implementations, the compliant support structures for multiple optical cleaning assemblies may be one contiguous component.

As noted earlier, in some implementations, the optical cleaning cartridge 110 may include a re-use prevention mechanism 178, e.g., a radio-frequency identification (RFID) tag, a near-field communications (NFC) tag, a machine-readable serial number, a bar code, a quick response (QR) code, or other identifier that may be read by the analysis unit 102 and used to identify the optical cleaning cartridge 110 in question and determined if the optical cleaning cartridge 110 should be used. For example, in some implementations, the analysis unit 102 may communicate such identifying information to a remote server that is communicatively connected with other analysis units 102, and the remote server may determine whether or not the optical cleaning cartridge 110 has been used previously with another analysis unit 102 (which would have also reported out that identifying information to the remote server during that earlier use). In other implementations, the optical cleaning cartridge 110 may include some form of memory, e.g., that may be part of an RFID component such as that shown in FIG. 2, that allows usage data for the optical cleaning cartridge 110 to be stored in the optical cleaning cartridge 110 itself. Such data may be read by the analysis unit 102 to determine if the optical cleaning cartridge 110 is unused; if already used, the analysis unit 102 may refuse to re-use the optical cleaning cartridge 110 and require that an unused replacement optical cleaning cartridge 110 be used. In such instances, when the analysis unit 102 performs cleaning operations using an optical cleaning cartridge 110, the analysis unit 102 may cause information stored in the optical cleaning cartridge 110 to be updated to reflect such usage and to prevent re-use later.

Figure 11:
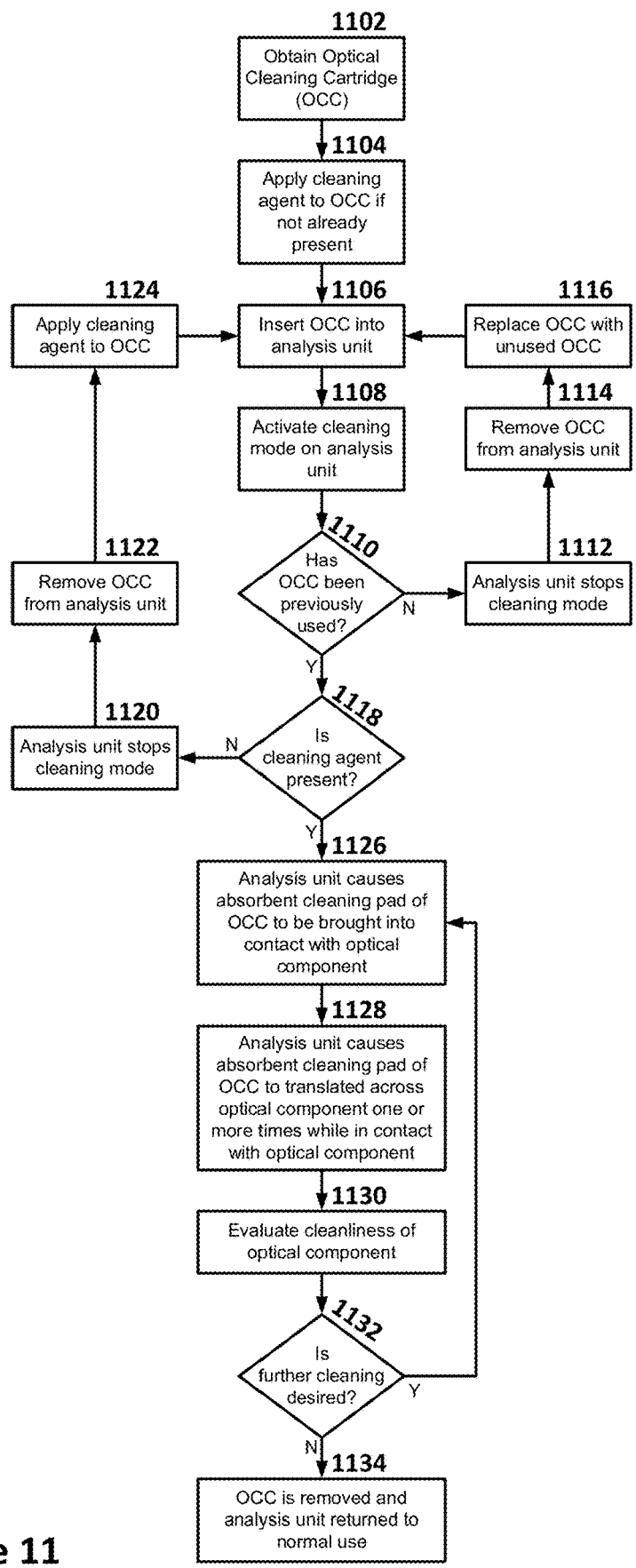
FIG. 11 depicts an example process flow for using an optical cleaning cartridge such as those described herein.

FIG. 11 depicts an example process flow for using an optical cleaning cartridge such as those described herein. Various aspects of such a process flow may be caused to occur by a controller of the analysis unit, although some aspects of the technique may be performed by a user or another system.

In block 1102, an optical cleaning cartridge may be obtained. In block 1104, the optical cleaning cartridge may be dosed with a liquid cleaning agent, if none is already present. For example, a predetermined amount of IPA may be applied to each optical cleaning assembly using a pipette or similar applicator. In block 1106, the optical cleaning cartridge may be inserted into an analysis unit that is to have one or more optical components cleaned. Once the optical cleaning cartridge is inserted into the analysis unit, a cleaning mode may be initiated on the analysis unit in block 1108. In some implementations, the analysis unit itself may be equipped with a cleaning agent reservoir and a system that is configured to dispense the cleaning agent into the cartridge. In such systems, the optical cleaning cartridge may be loaded into the analysis unit first, and the analysis unit may then deliver the cleaning agent to the appropriate optical cleaning assemblies.

In some implementations, the optical cleaning cartridge may be pre-dosed with a liquid cleaning agent, e.g., a metered amount of liquid cleaning agent may be applied to each absorbent cleaning pad prior to being packaged and shipped to a customer. In such implementations, the optical cleaning cartridge may be packaged in a sealed wrapper, or the optical cleaning assembly wells may be sealed with removable caps (plastic or elastomeric caps, for example, that may press-fit around the optical cleaning assembly well sidewalls), to prevent leakage and/or evaporation of the liquid cleaning agent. Prior to use, the wrapper or caps may be removed by the user. In some such instances, the wrapper or caps may be colored or patterned in a manner that makes it easy to visually confirm if the wrapper or caps have been removed, e.g., the caps may be made from a red, orange, black, blue, or green material that has high contrast with a white or off-white material used for the absorbent cleaning pads. In some such implementations, the analysis unit itself may scan or image the absorbent cleaning pads prior to use to confirm that the wrapper or cap has been entirely removed—detection of any region that still has the high-contrast color, for example, may indicate that the wrapper or cap has not been completely removed. The analysis unit may halt operations and indicate that the optical cleaning cartridge has not been properly configured for use.

FIG. 12 depicts a cross-section of an example optical cleaning cartridge insert with a sealing cap. The insert 116 is similar to that shown in FIG. 4', and similar callouts are used to indicate similar structures (some components are omitted from what is shown in FIG. 4', however). The cover plate 124 is different in shape from that in FIG. 4', but serves a similar function. An elastomeric or plastic cap 188 is shown that seals around the optical cleaning assembly well 138, sealing against the sidewalls of the optical cleaning assembly well 138. The cap 188 may be sealed to the optical cleaning assembly well 138 after the absorbent cleaning pad 120 is dosed with liquid cleaning agent, thereby sealing the liquid cleaning agent inside and preventing leakage. Prior to use, the cap 188 may be removed.

FIG. 13 depicts a cross-section of an example optical cleaning cartridge insert with a sealing membrane. This example is similar to that of FIG. 12, except that a plastic membrane or wrapper 190 has been applied over the absorbent cleaning pad 120 (after the absorbent cleaning pad 120 has been dosed with liquid cleaning agent) and adhered or glued to the walls that form the perimeter of the optical cleaning assembly well 138. A tab 192 of the membrane or wrapper 190 may extend beyond the edge of the optical cleaning assembly well 138 to allow a user to easily peel the membrane or wrapper 190 off of the optical cleaning cartridge.

As part of the cleaning mode, the analysis unit may, optionally, check in block 1110 to see if the optical cleaning cartridge has been previously used, as discussed earlier herein. If it is determined by the analysis unit in block 1110 that the optical cleaning cartridge has been previously used, then the analysis unit may stop the cleaning mode in block 1112 and the optical cleaning cartridge may be removed from the analysis unit in block 1114 before being replaced by a new optical cleaning cartridge in block 1116 which may then be inserted into the analysis unit in block 1106, at which point the cleaning mode of the analysis unit may be restarted.

If it is determined in block 1110 that the optical cleaning cartridge has not been previously used (or if no check for previous use of the optical cleaning cartridge is performed at all), the technique may optionally proceed to block 1118, in which the analysis unit may check, using one of the techniques or technologies discussed earlier herein, whether or not cleaning agent is present in the optical cleaning cartridge. If it is determined in block 1118 that the cleaning agent is not present, the analysis unit may stop the cleaning mode in block 1120 and the optical cleaning cartridge may be removed from the analysis unit in block 1122, after which the cleaning agent may be applied to the optical cleaning cartridge in block 1124 before the optical cleaning cartridge is re-inserted into the analysis unit in block 1106, at which point the cleaning mode of the analysis unit may be restarted.

If it is determined in block 1118 that there is cleaning agent in the optical cleaning cartridge (or if no check for cleaning agent is performed at all), the technique may proceed to block 1126, in which the analysis unit may cause an absorbent cleaning pad of the optical cleaning cartridge to come into contact with an optical component to be cleaned. This may involve translating the optical cleaning cartridge and/or the optical component horizontally (in the X and/or Y directions) so that the absorbent cleaning pad is generally centered underneath the optical component, and then translating the optical cleaning cartridge and/or the optical component vertically (in the Z direction) so that the absorbent cleaning pad and the optical component come into contact.

The analysis unit may then, in block 1128, cause the absorbent cleaning pad to be translated laterally, e.g., in a lemniscate pattern, bowtie pattern, or other pattern, one or more times to cause the absorbent cleaning pad to be wiped across the optical component while being compressed against the optical component by the compliant support structure.

In some implementations, the cleanliness of the optical component may be optionally evaluated in block 1130 to determine the effectiveness of a cleaning operation. For example, the optical cleaning cartridge and/or optical component may be moved so that optical cleaning cartridge is not blocking the optical path of the optical component and the optical component may therefore be used to perform a test measurement in which the transmissivity of the optical component may be evaluated under one or more conditions.

In block 1132, a determination may be made as to whether further cleaning is desired. Such a determination may be made based on the results of a cleanliness evaluation, as discussed with respect to block 1130, or may be made based on a predetermined cleaning schedule. For example, if an optical cleaning cartridge has three optical cleaning assemblies, a separate cleaning cycle may be performed with each optical cleaning assembly (an initial cleaning cycle, an intermediate cleaning cycle, and a final cleaning cycle), regardless of the cleanliness level of the optical component. If multiple optical cleaning assemblies are present on the optical cleaning cartridge, then the analysis unit may periodically translate the optical component and the optical cleaning cartridge relative to one another so as to engage the absorbent cleaning pad of one of the other optical cleaning assemblies with the optical component, and so forth. If it is determined in block 1132 that further cleaning is to be performed, then the technique may return to block 1126, at which point the analysis unit may cause the same, or a different, optical cleaning assembly of the optical cleaning cartridge to be centered under the optical component before proceeding to block 1128.

If it is determined in block 1132 that no further cleaning operations are needed, the analysis unit may stop the cleaning mode and the optical cleaning cartridge may be removed, thereby allowing the analysis unit to return to normal use.

Optical cleaning cartridges such as those discussed herein were found to offer vastly superior and repeatable cleaning performance as compared with manual cleaning, especially in systems in which the optical components could only feasibly be cleaned manually using a "blind" cleaning technique. For example, in many analysis systems, it is difficult or impossible for a user to actually directly inspect the outermost surface of the optical components, as such surfaces may frequently be located inside the analysis unit in a location that does not have sufficient clearance for the user's head. Moreover, there may not even be sufficient clearance or access for a user to inspect such surfaces even indirectly, e.g., using a mirror or other device. In such instances, the user may need to resort to "blind" cleaning, where they must work by touch or otherwise without direct visual confirmation to clean the optical components. Such cleaning operations may be highly susceptible to variation in efficacy since the process is manual, and may vary from user to user or even between different attempts of the same user. To illustrate the contrast between blind cleaning and optical cleaning cartridge-based cleaning, photographs of optical components after manual blind cleaning and after cleaning with an optical cleaning cartridge are discussed below.

Figure 14:
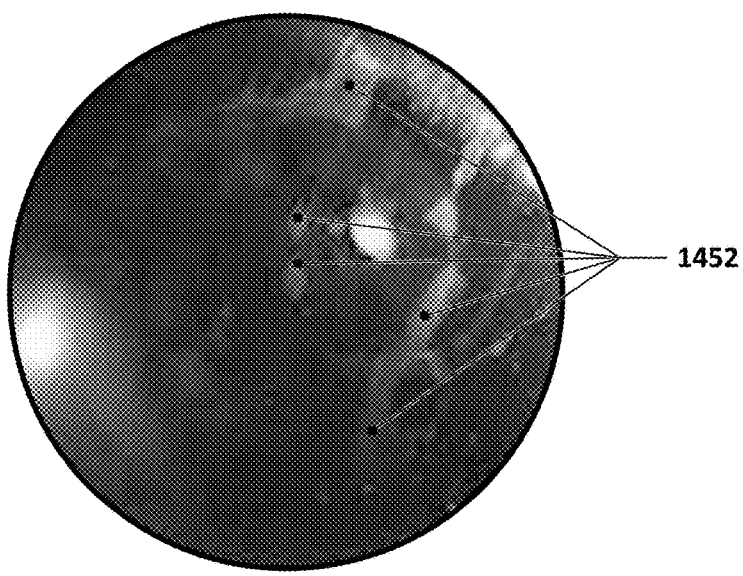
FIG. 14 is a magnified photograph of a contaminated example optical component after two blind manual cleaning passes.

FIG. 14 is a magnified photograph of a contaminated example optical component after two blind manual cleaning passes. As can be seen, streaks of lighter-colored residue or contaminants 1452 remain on the lens even after two passes of manual cleaning.

Figure 15:
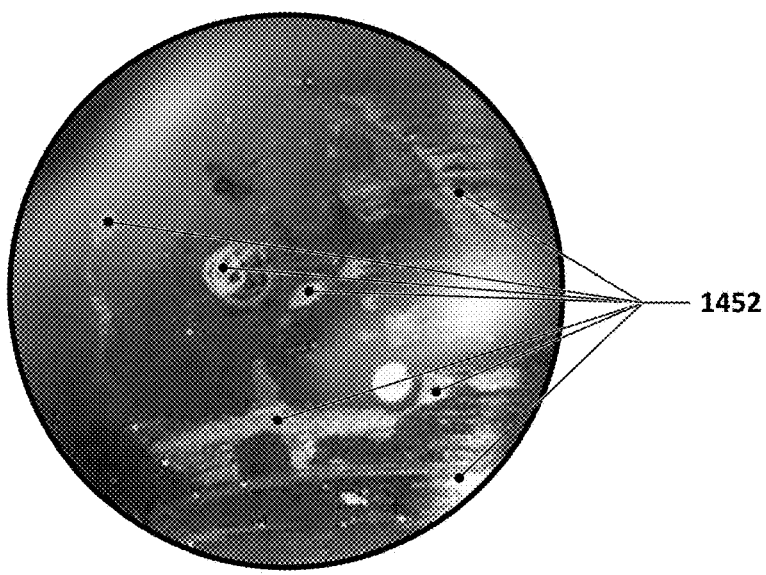
FIG. 15 is a magnified photograph of a contaminated example optical component after blind manual cleaning passes that resulted in an additional 2% intensity loss through the optical component.

FIG. 15 is a magnified photograph of a contaminated example optical component after blind manual cleaning passes (using, for example, an absorbent cleaning pad supported by a technician's finger and wetted with IPA) that resulted in an additional 2% intensity loss through the optical component. In this example, two passes of manual cleaning actually exacerbated the contamination problem, as the contaminants 1452 were smeared across a larger area of the optical component. While some of the contaminant was removed, thereby improving transmissivity of the optical component in those areas, other areas of the optical component that were not previously contaminated had contaminant transferred to them, resulting in an actual 2% further decrease in signal strength through the optical component. The 2% degradation discussed above is, of course, simply the result of one example cleaning done by a particular individual; other cleanings done by the same individual or other individuals may exhibit more or less degradation.

Figure 16:
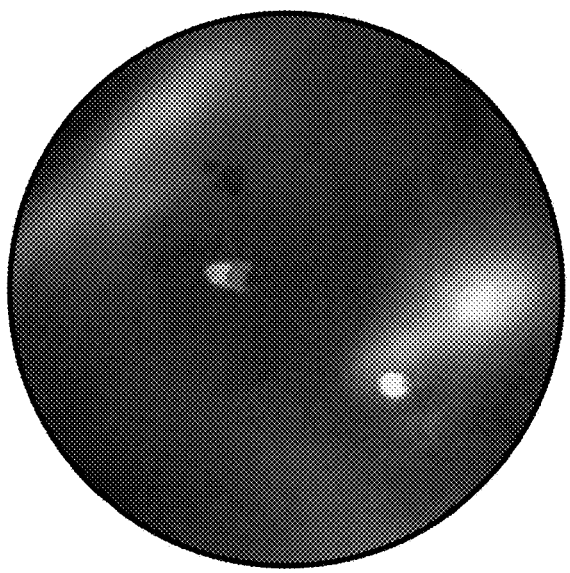
FIG. 16 is a magnified photograph of a contaminated example optical component after cleaning using the example optical cleaning cartridge of FIG. 1.

FIG. 16 is a magnified photograph of a contaminated example optical component after cleaning using the example optical cleaning cartridge of FIG. 1. In contrast to the lenses shown in FIGS. 14 and 15, the lens in FIG. 16 has been cleaned using an optical cleaning cartridge such as the optical cleaning cartridge 110 (with IPA as the cleaning agent) and techniques such as those discussed above. As can be seen, the surface of the optical component is almost or entirely completely free of contaminants, in stark contrast to the results of the manual blind cleaning operations.

It is to be understood that the phrase "for each <item> of the one or more <items>," if used herein, should be understood to be inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood.

Terms such as "about," "approximately," "substantially," "nominal," or the like, when used in reference to quantities or similar quantifiable properties, are to be understood to be inclusive of values within ±10% of the values or relationship specified (as well as inclusive of the actual values or relationship specified), unless otherwise indicated.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

It is to be further understood that the above disclosure, while focusing on a particular example implementation or implementations, is not limited to only the discussed example, but may also apply to similar variants and mechanisms as well, and such similar variants and mechanisms are also considered to be within the scope of this disclosure.

What is claimed is:

1. An apparatus for cleaning an optical component in an analysis unit that is configured to analyze, using the optical component, samples that are located in a removable cartridge during analysis, the apparatus comprising:
    a cleaning cartridge frame that is configured to be receivable by and supported by a cartridge receiver of the analysis unit that is configured to receive and support the removable cartridge; and
    one or more optical cleaning assemblies, each optical cleaning assembly including:
        an absorbent cleaning pad, and
        a compliant support structure that is proud of a surface of the cleaning cartridge frame and interposed between the cleaning cartridge frame and at least a portion of the cleaning pad.

2. The apparatus of claim 1, wherein the compliant support structure comprises an elastomeric material and has a first portion that is a domed shape.

3. The apparatus of claim 2, wherein the domed shape has a radius that at least substantially matches a radius of curvature of a surface of the optical component that faces towards the cleaning cartridge frame when the apparatus is supported by the cartridge receiver.

4. The apparatus of claim 1, wherein the absorbent cleaning pad is a laminate including a microfiber layer and a foam layer interposed between the microfiber layer and the compliant support structure.

5. The apparatus of claim 1, wherein:
    the cleaning cartridge frame has a corresponding optical cleaning assembly well for each optical cleaning assembly,
    each corresponding optical cleaning assembly well has one or more sidewalls and a floor, and
    each optical cleaning assembly is located in the corresponding optical cleaning assembly well.

6. The apparatus of claim 5, wherein:
    each optical cleaning assembly further includes a corresponding cover plate that is sized to at least extend to the sidewalls of the corresponding optical cleaning assembly well,
    each cover plate has an aperture sized to allow the compliant support structure of the corresponding optical cleaning assembly to protrude through the cover plate, and
    at least a portion of the absorbent cleaning pad for each optical cleaning assembly is sandwiched between the corresponding cover plate for the optical cleaning assembly and the cleaning cartridge frame.

7. The apparatus of claim 1, further comprising at least one sensor selected from the group consisting of: an alcohol detection sensor and a liquid detection sensor, wherein the at least one sensor is positioned so as to detect, respectively, alcohol or liquid, present in the optical cleaning assembly well.

8. The apparatus of claim 1, wherein at least a portion of the absorbent cleaning pad includes an indicator that causes the portion of the absorbent cleaning pad to change color when exposed to a substance selected from the group consisting of: a liquid and isopropyl alcohol.

9. The apparatus of claim 1, wherein the number of optical cleaning assemblies is selected from the group consisting of: one optical cleaning assembly, two optical cleaning assemblies, three optical cleaning assemblies, four optical cleaning assemblies, and more than four optical cleaning assemblies.

10. The apparatus of claim 1, further comprising a re-use prevention mechanism selected from the group consisting of: a radio-frequency identification tag, a bar code, a quick response (QR) code, a serial number, and a near field communication tag.

11. A kit comprising:
the apparatus of claim 1, and
at least one item selected from the group consisting of: a container of liquid cleaning agent, a syringe, and a pipette.

12. A method comprising:
a) obtaining an apparatus of that includes:
a cleaning cartridge frame; and
one or more optical cleaning assemblies, each optical cleaning assembly including:
an absorbent cleaning pad, and
a compliant support structure that is proud of a surface of the cleaning cartridge frame and interposed between the cleaning cartridge frame and at least a portion of the cleaning pad;
b) applying a liquid cleaning agent to the absorbent cleaning pad of a first optical cleaning assembly of the one of the one or more optical cleaning assemblies;
c) installing the apparatus into a cartridge receiver of an analysis unit;
d) controlling the analysis unit to cause relative vertical translation between the cartridge receiver and an optical component of the analysis unit such that the optical component of the analysis unit and the absorbent cleaning pad of the first optical cleaning assembly come into contact with one another and such that the absorbent cleaning pad of the first optical cleaning assembly and the compliant support structure of the first optical cleaning assembly are compressed by a first amount; and
e) controlling the analysis unit to cause relative horizontal translation between the cartridge receiver and the optical component so as to cause the absorbent cleaning pad of the first optical cleaning assembly to clean the optical component.

13. The method of claim 12, wherein (e) includes controlling the analysis unit to cause relative horizontal translation between the cartridge receiver and the optical component in a bowtie (⋈) pattern or a lemniscate (∞) pattern for one or more times.

14. The method of claim 12, wherein at least a portion of the absorbent cleaning pad includes an indicator that causes the portion of the absorbent cleaning pad to change color when exposed to a substance selected from the group consisting of: a liquid and isopropyl alcohol and the method further comprises:
controlling the analysis unit to cause the analysis unit to obtain imaging data of the absorbent cleaning pad of the first optical cleaning assembly prior to (d) or (e), and
determining that the liquid cleaning agent has been applied to the absorbent cleaning pad of the first optical cleaning assembly based on a color detected in the imaging data.

15. The method of claim 12, wherein the method further comprises:
controlling the analysis unit to cause the analysis unit to obtain imaging data of the absorbent cleaning pad of the first optical cleaning assembly prior to (d) or (e), and
determining that the liquid cleaning agent has been applied to the absorbent cleaning pad of the first optical cleaning assembly based on reflectivity of the absorbent cleaning pad measured from the imaging data.

16. The method of claim 12, wherein the apparatus further includes at least one sensor selected from the group consisting of: i) an alcohol detection sensor and ii) a liquid detection sensor, the at least one sensor is positioned so as to detect, respectively, alcohol or liquid, present in the optical cleaning assembly well, and the method further comprises:
controlling the analysis unit to obtain a sensor reading from the at least one sensor prior to (d) or (e).

17. An analysis unit comprising:
an optical sensor head including an optical component;
a cartridge receiver configured to receive and support a removable cartridge; and
a controller including one or more processors and a memory, wherein:
the one or more processors are communicatively connected with the memory, and
the memory stores instructions for controlling the one or more processors to:
a) determine that an apparatus has been installed in the cartridge receiver, the apparatus including:
a cleaning cartridge frame; and
one or more optical cleaning assemblies, each optical cleaning assembly including:
an absorbent cleaning pad, and
a compliant support structure that is proud of a surface of the cleaning cartridge frame and interposed between the cleaning cartridge frame and at least a portion of the cleaning pad;
b) cause relative vertical translation between the cartridge receiver and the optical component such that the optical component and the absorbent cleaning pad of a first optical cleaning assembly of the one or more optical cleaning assemblies of the apparatus come into contact with one another and such that the absorbent cleaning pad of the first optical cleaning assembly and the compliant support structure of the first optical cleaning assembly are compressed by a first amount; and
c) cause relative horizontal translation between the cartridge receiver and the optical component so as to cause the absorbent cleaning pad of the first optical cleaning assembly to clean the optical component.

18. The analysis unit of claim 17, wherein the apparatus includes a re-use prevention mechanism selected from the group consisting of: a radio-frequency identification tag, a bar code, a quick response (QR) code, a serial number, and a near field communication tag and the memory further stores instructions for controlling the one or more processors to further cause the analysis unit to:
obtain data from the re-use prevention mechanism,
determine whether the apparatus is authorized to be used based on the data, and
perform (b) and (c) only when the apparatus is determined to be authorized for use.

19. The analysis unit of claim 17, wherein the memory further stores instructions for controlling the one or more processors to further cause, as part of (c), relative horizontal translation between the cartridge receiver and the optical component in a bowtie (⋈) pattern or a lemniscate (∞) pattern for one or more times.

20. The analysis unit of claim 17, wherein at least a portion of the absorbent cleaning pad includes an indicator that causes the portion of the absorbent cleaning pad to change color when exposed to a substance selected from the group consisting of: a liquid and isopropyl alcohol and the memory further stores instructions for controlling the one or more processors to further cause the analysis unit to:
  obtain imaging data of the absorbent cleaning pad of the first optical cleaning assembly prior to (b) or (c), and
  determine that a liquid cleaning agent has been applied to the absorbent cleaning pad of the first optical cleaning assembly based on a color detected in the imaging data.

21. The analysis unit of claim 17, wherein the memory further stores instructions for controlling the one or more processors to further cause the analysis unit to:
  obtain imaging data of the absorbent cleaning pad of the first optical cleaning assembly prior to (b) or (c), and
  determine that a liquid cleaning agent has been applied to the absorbent cleaning pad of the first optical cleaning assembly based on reflectivity of the absorbent cleaning pad measured from the imaging data.

22. The analysis unit of claim 17, wherein the apparatus further includes at least one sensor selected from the group consisting of: an alcohol detection sensor and a liquid detection sensor, wherein the at least one sensor is positioned so as to detect, respectively, alcohol or liquid, present in the optical cleaning assembly well and the memory further stores instructions for controlling the one or more processors to further cause the analysis unit to:
  obtain a sensor reading from the at least one sensor prior to (b) or (c), and
  determine that a liquid cleaning agent has been applied to the absorbent cleaning pad of the first optical cleaning assembly based on the sensor reading.

* * * * *

UNITED STATES PATENT AND TRADEMARK OFFICE
CERTIFICATE OF CORRECTION

PATENT NO. : 10,828,675 B2
APPLICATION NO. : 16/373243
DATED : November 10, 2020
INVENTOR(S) : Ashish Kumar et al.

Page 1 of 1

It is certified that error appears in the above-identified patent and that said Letters Patent is hereby corrected as shown below:

In the Claims

In Column 17, Line 20, in Claim 12, after "apparatus" delete "of."

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*